May 6, 1958 J. A. OLIVIER ET AL 2,833,593
CONVERTIBLE TOP WITH AN INFLATABLE COVERING
Filed Dec. 28, 1953 3 Sheets-Sheet 1

INVENTORS
Jules A. Olivier &
BY William J. Tell
Paul Fitzpatrick
ATTORNEY

May 6, 1958  J. A. OLIVIER ET AL  2,833,593
CONVERTIBLE TOP WITH AN INFLATABLE COVERING
Filed Dec. 28, 1953  3 Sheets-Sheet 3

INVENTORS
Jules A. Olivier &
BY William J. Teit
Paul Fitzpatrick
ATTORNEY

United States Patent Office 2,833,593
Patented May 6, 1958

2,833,593
CONVERTIBLE TOP WITH AN INFLATABLE COVERING

Jules A. Olivier, Detroit, and William J. Tell, Birmingham, Mich., assignors to General Motors Corporation, Detroit, Mich., a corporation of Delaware Application December 28, 1953, Serial No. 400,614

4 Claims. (Cl. 296—107)

This invention relates to passenger vehicles and particularly to convertible top structures for such vehicles. Despite the versatility and appeal of automobiles of the convertible type, they constitute a small part of the total production of automobiles, largely because of certain disadvantages which have been regarded as inherent in convertible tops. Our invention is directed to curing or minimizing many disadvantages of convertible tops as now known so as to improve the safety, comfort, and appearance of such tops.

A feature contributing greatly to the increased comfort and improved appearance of the vehicle lies in the use for the top covering or fabric of a material comprising two layers of impervious material tied together at closely adjacent points over the surface thereof, with means for inflating the space between the two layers. When the top fabric is so inflated, it acquires a measure of stiffness and self-supporting quality which causes it to round out the angularity commonly associated with convertible tops. In addition, the double walled top construction provides greater insulation against heat and noise. Any suitable arrangement may be provided to inflate the top fabric and to vent the air therefrom to facilitate lowering or folding of the top. The fabric in its deflated condition is much more amenable to folding and storage in a compact space than a padded top. Thus, the top according to the invention partakes of the advantages of padded tops without the accompanying bulk.

A further feature of the invention may involve the provision of a rigid rear window of large area instead of the usual small glass window or larger soft plastic window. In the preferred embodiment of the invention, the rear window structure is received in the top well in the body when the top is lowered and moves as a rigid unit upwardly out of the body as the top is raised. The large glass rear window which is made possible by the invention greatly improves the rearward vision and, therefore, the safety of the occupants of the vehicle.

As a further feature of this part of the top, the usual package shelf which extends from the lower edge of the window to the rear seat in closed bodies may be provided in the convertible body and may be mounted on the rear window so as to move therewith into operative position as the top is raised.

The principal objects of the invention are to improve convertible vehicles, to provide an improved convertible top, to provide a smoothly rounded and attractive appearing convertible top which is readily folded and stowed in a small space, to provide a top with improved insulation against heat and cold, to provide a rear window structure for a convertible vehicle which is movable into and out of the body, and to provide a large rigid rear window for a convertible top.

Other objects and advantages of the invention and the preferred structure in which the invention is embodied will be apparent from the succeeding detailed description and the accompanying drawings in which.

Figure 1:
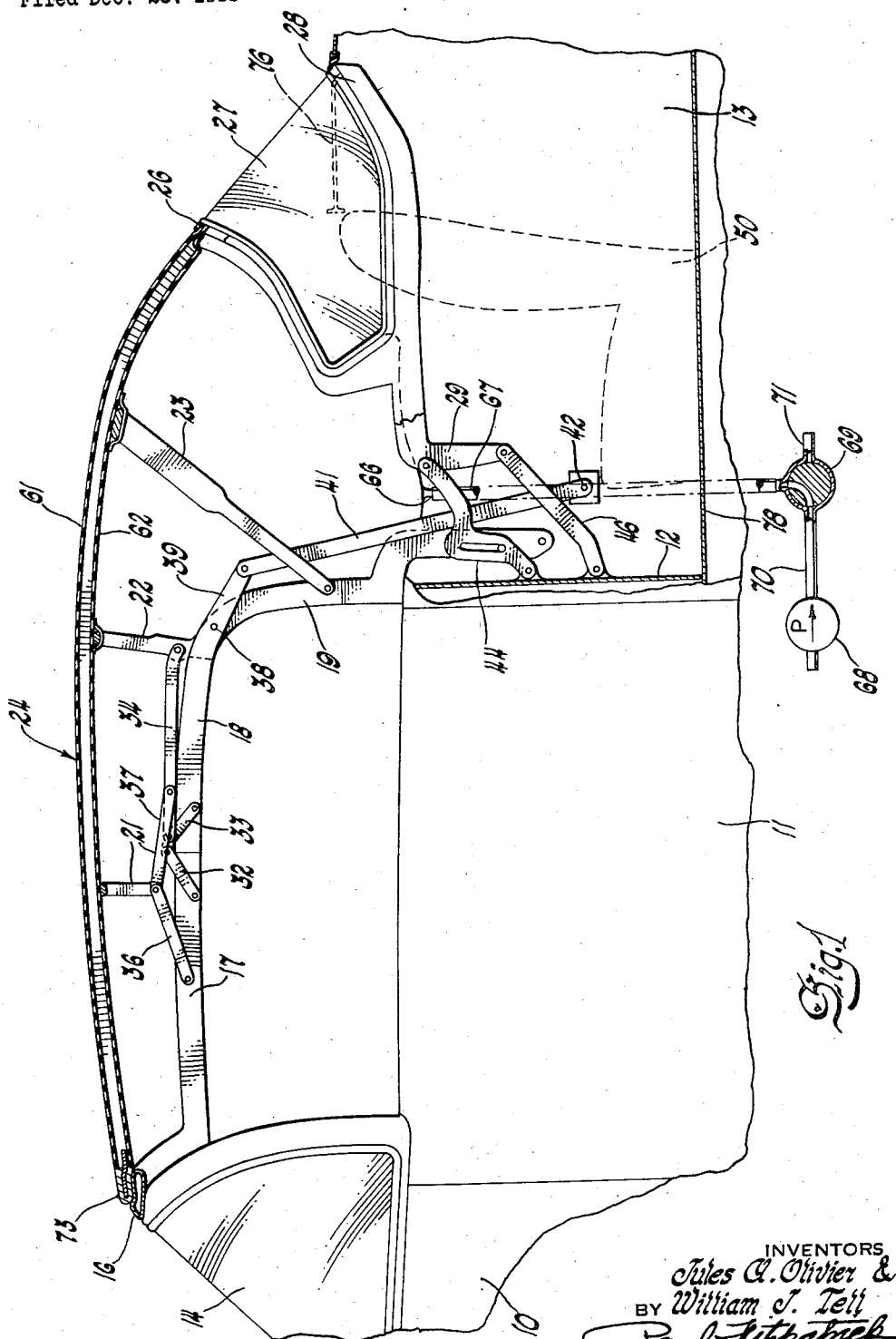
Fig. 1 is a side view of the major part of the body of a convertible automobile, certain parts being shown in section, the top being in raised position.

Referring first to Fig. 1 for the general installation, this figure illustrates a part of an automobile body of the convertible type having a side wall 10 in which is mounted a door 11 which closes against a doorpost 12 at the forward end of the rear quarter section 13 of the body. The windshield 14 is mounted on the body and the upper part of the frame of the windshield is engaged by the front header 16 of the convertible top which may be integral with a forward portion 17 of each side rail of the top. The side rails include an intermediate portion 18 and a rear rail portion 19. On the side rails are mounted front intermediate, and rear bows 21, 22, and 23, respectively, upon which is supported the top fabric 24 which extends from the header 16 to the top header 26 of the frame of a rear body window 27 and from one side rail to the other. The rear window 27 is of a wraparound type and extends along the side of the body between the upper header frame 26 and a lower frame member 28 which follows and engages the belt line of the body when the window is in its raised position as illustrated in Fig. 1.

The rear window frame comprises two arms 29 which extend forwardly and downwardly from the frame by which the window frame is supported so that it may be raised and lowered with the top.

Figure 2:
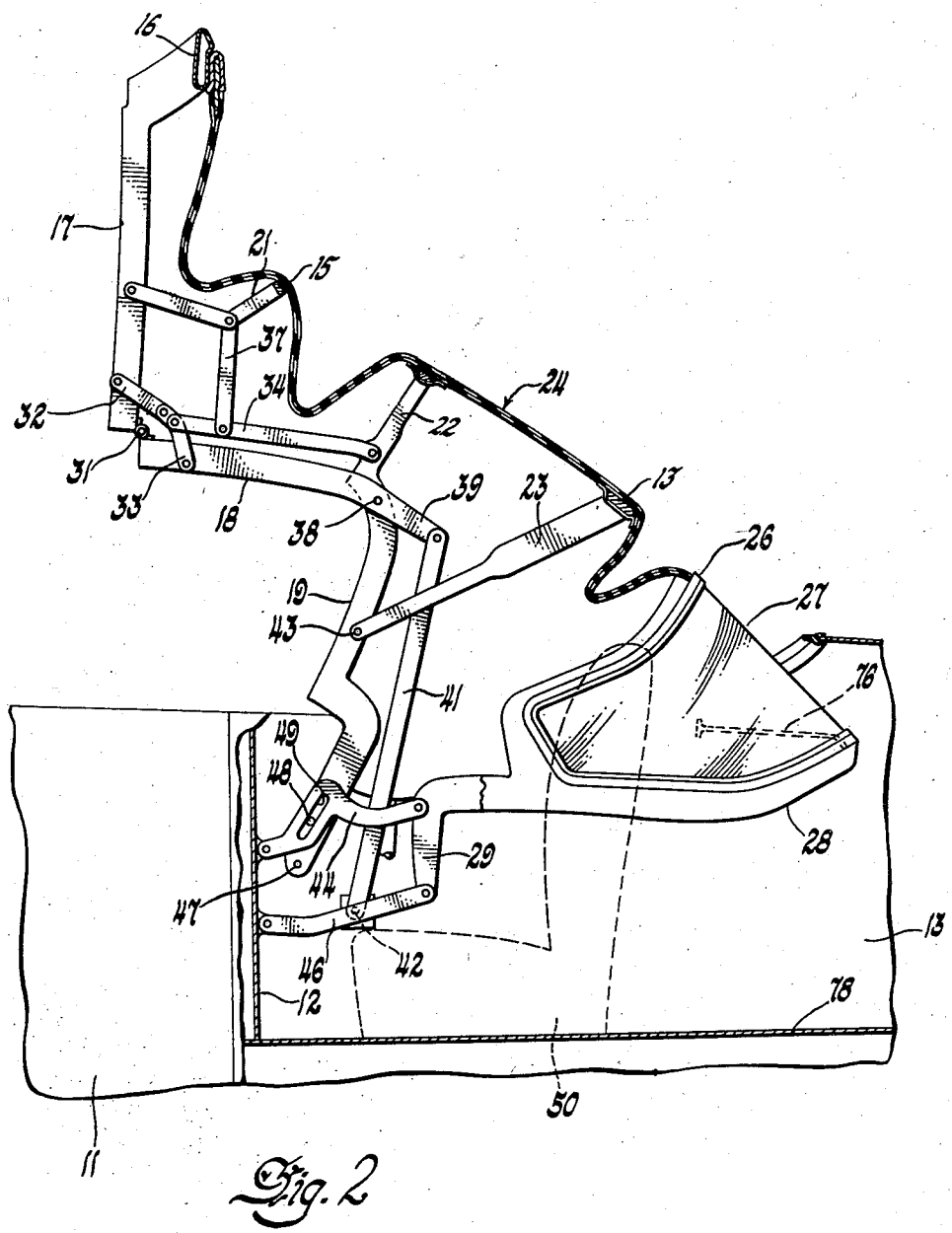
Fig. 2 is a similar view with the top partly lowered.
Figure 3:
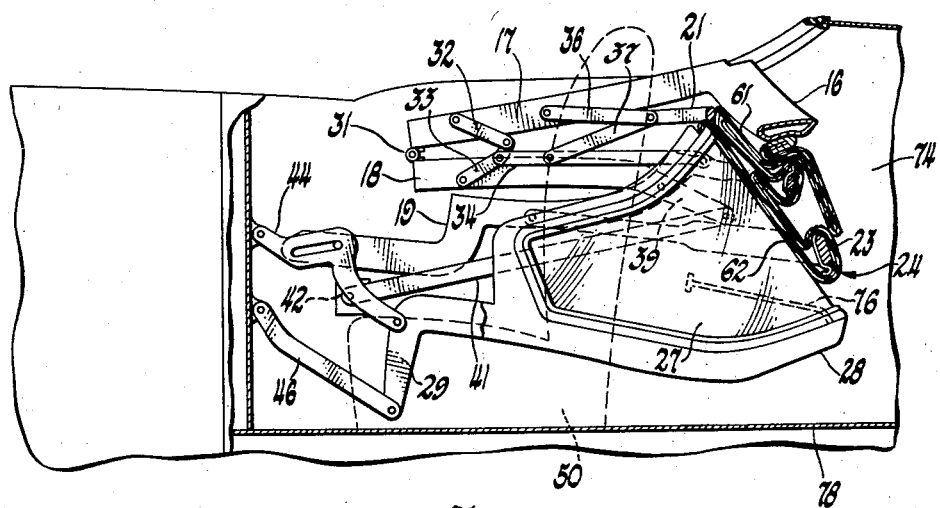
Fig. 3 is a similar view with the top fully lowered.

The top linkage, apart from the arrangement by which the rear window is raised and lowered, may be of conventional type such as is commonly used for convertible tops and may be actuated by a suitable motor (not shown) in any usual manner. As will be more clearly apparent from Figs. 1 and 2, the front rail section 17 is pivoted to the intermediate rail section 18 at 31 and these two parts are additionally coupled by two articulated links 32 and 33 which are pivotally connected to the side rails. The rear rail section 19 and bow 22 are a unitary part coupled by link 34 to the link 33. The front bow 21 is mounted on pivoted links 36 and 37 connected to the rail 17 and link 34, respectively. The intermediate rail 18 is pivoted on the rear rail at 38 and has an integral rearward extension 39 coupled by a link 41 to a fixed point 42 in the rear quarter of the body. The rear bow 23 is pivoted at 43 to the rear rail 19. It will be understood, of course, that these pivots and links are provided on both sides. The forward depending portion 29 of the rear window frame is coupled by means of generally parallel pivoted links 44 and 46 to the body pillar 12. The rear rail 19 is swingably mounted at the body at 47 and has extending therefrom a pin 48 which moves in a slot 49 in the link 44. As will be apparent from Figs. 1, 2, and 3, respectively, which show the top extended, partly folded, and completely folded, the linkages couple the several parts so that the top supporting structure of rails and bows folds into a compact structure in the usual well at each side of and to the rear of the rear seat 50 of the car and, concurrently with the folding of the top, the rear window 27 drops into the top well. The links 44 and 46, as shown, act nearly as a parallel linkage so that the window frame 29 is lowered into the body rather than being swung about a pivot, thus providing ample room above it for the top mechanism.

Figure 4:
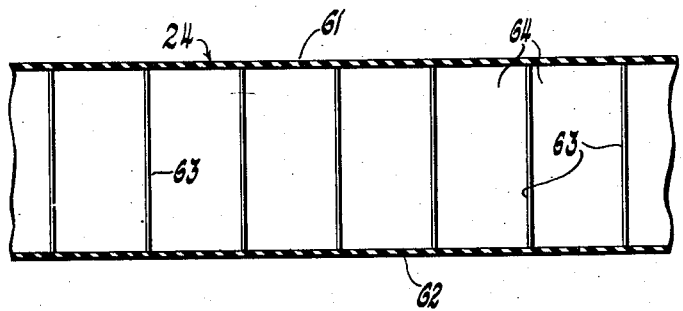
Fig. 4 is a greatly enlarged sectional view through the top fabric.

Referring to Figs. 1 and 4, the top fabric is unusual in that it is a double-walled fabric. While no claim is made to the invention of the fabric as such, the application thereof to a folding or convertible top with the attendant advantages are believed to be new. Referring to Fig. 4, the fabric 24 comprises inner and outer layers 61 and 62 which may, for example, in this application be spaced about three-fourths of an inch apart and are joined by numerous tension threads 63 which are closely spaced and which are woven into or otherwise united to the walls 61 and 62. The walls are airtight so that the space 64 between them may be inflated to hold the walls apart. This puts the threads 63 in tension, and also the walls 61 and 62, so that the material tends to remain plane and thus has a certain amount of rigidity. For this reason, when disposed over the top frame as illustrated in Fig. 1, a smoother appearance is secured than with the single fabrics which tend to pull or sag and to show the outline of the bows within. The double-walled construction also reduces conduction of heat and noise through the top, greatly adding to the comfort of the vehicle.

The top fabric must be deflated to reduce its bulk and increase its flexibility for lowering the top. Any suitable means may be provided for inflating and deflating the top material at will. As illustrated schematically in Fig. 1, at a suitable point in the top, preferably near the belt line, a filler stem 66 is vulcanized or otherwise sealed into the top, this stem being connected by a flexible hose 67 with inflating mechanism represented schematically by a pump 68 and a three-way valve 69. With the valve in the position shown in Fig. 1, the pump is connected through line 70 and the valve to inflate the top. The valve may be rotated 45° to the right to hold the top inflated or 90° to the right to exhaust the top through the vent line 71. If desired, line 71 may be connected to the engine intake manifold or a vacuum pump (not shown) to provide subatmospheric pressure to exhaust the top. It will be apparent, of course, that any suitable source or pump, or any suitable valve arrangement, may be used and that the valve may be interconnected for control with the motor for raising and lowering the top so that the top is vented before lowering is started and is automatically inflated after it is raised.

As will be apparent, the large rigid rear window has many advantages over the smaller flexible windows in usual convertibles which lose their transparency. A desirable feature of this window lies in the provision of a package shelf 76 extending from the lower window frame 28 to the rear seat 50 and descending into the body with the window frame.

As will be apparent, the top frame is in effect a lazy tongs type of linkage, with some modifications, and the rear window frame mounting is a parallel type linkage. Since these are coupled together through the pin and slot connections 48 and 49, the window and top move up and down in proper timing to each other. A power actuator for the top may be coupled in any suitable manner to any part of this linkage such as the main bow 19 or between the portions 29 of the rear frame and the car floor 78. Since such motors are conventional and the details of the installation thereof are immaterial to the invention, the motor is not shown. It will be understood, of course, that the top could be operated manually, although this is not commercially desirable.

The detailed description of the preferred embodiment of the invention for the purpose of explaining the principles, construction, and advantages thereof is not to be considered as limiting or restricting the invention, which is susceptible of numerous modifications by the exercise of skill in the art.

We claim:

1. In a convertible vehicle the combination comprising a collapsible top frame supported by said vehicle for movement between raised and lowered positions, an inflatable and deflatable flexible envelope carried by said top frame and covering said top frame in the raised position thereof, said envelope including two layers of impervious material forming an air tight enclosure and a number of tension members joined to said layers to hold said layers in predetermined spaced relationship when said envelope is inflated, means for inflating and deflating said envelope, a window extending between the rear quarter area of said vehicle and said flexible envelope in the raised position thereof, parallelogram linkage means mounting said window within said vehicle for substantially vertical movement between raised and lowered positions, said window being interconnected with said top frame whereby said window is raised and lowered as said top frame is raised and lowered, a seat within said vehicle located forwardly of said window, and a package shelf extending from adjacent the lower edge of said window to adjacent said seat, said package shelf being supported by and movable with said window.

2. In a convertible vehicle the combination comprising a foldable top frame supported by said vehicle for movement between raised and lowered positions and including a pair of foldable side rails joined by a number of spaced transverse bows, an inflatable and deflatable flexible envelope secured to said bows and covering said top frame in the raised position thereof, said envelope including two layers of impervious material forming an air tight enclosure and a number of tension members joined to said layers to hold said layers in predetermined spaced relationship when said envelope is inflated in the raised position of said top frame, means for inflating and deflating said envelope, a window extending between the rear quarter area of said vehicle and said flexible envelope in the raised position thereof, parallelogram linkage means supporting said window within said vehicle for substantially vertical movement between raised and lowered positions, said linkage means being interconnected with said foldable side rails whereby said window is raised and lowered as said top frame is raised and lowered, a seat within said vehicle located forwardly of said window, and a package shelf extending from adjacent the lower edge of said window to adjacent said seat, said package shelf being supported by and movable with said window.

3. A top structure for convertible vehicles comprising, in combination, a foldable top frame including a pair of spaced foldable side rails joined by a number of spaced transverse bows, means supporting said top frame on said vehicle for movement between raised and lowered positions, an inflatable and deflatable flexible envelope secured to said bows and movable therewith for covering said bows and said top frame in the raised position thereof, said envelope including two layers of impervious material forming an air-tight enclosure and a number of tension members joined to said layers to hold said layers in predetermined spaced relationship when said envelope is inflated, means for inflating and deflating said envelope whereby said envelope may be inflated in the raised position of said top frame and may be deflated to allow said top frame to be moved to lowered position, and a window extending between the rear quarter area of said vehicle and said flexible envelope in the raised position of said top frame, said window being supported by said vehicle for substantially vertical movement between raised and lowered positions and being operatively interconnected with said top frame whereby said window is raised and lowered as said top frame is raised and lowered.

4. A top structure for convertible vehicles comprising, in combination, a foldable top frame including a pair of spaced foldable side rails joined by a front header member and a number of transverse bows, means supporting said top frame on said vehicle for movement between raised and lowered positions, an inflatable and deflatable flexible envelope including an upper and lower layer, said lower layer being secured to said front header member and to said bows and movable therewith for covering said bows and said top frame in the raised position thereof, said upper and lower layers of said envelope being of impervious material forming an air-tight closure and a number of tension members secured to said layers to hold said layers in predetermined spaced relationship when said envelope is inflated, and means for inflating and deflating said envelope whereby said envelope may be inflated when said top frame is in raised position and may be deflated to allow said top frame to be moved to lowered position.

References Cited in the file of this patent

UNITED STATES PATENTS

| | | |
|---|---|---|
| 1,150,811 | Cooke | Aug. 17, 1915 |
| 1,940,444 | Burgman | Dec. 19, 1933 |
| 2,210,590 | Jobst | Aug. 6, 1940 |
| 2,448,054 | Seckel | Aug. 31, 1948 |
| 2,593,360 | Sulkowski | Apr. 15, 1952 |
| 2,617,681 | Hawver et al. | Nov. 11, 1952 |
| 2,623,779 | Catell | Dec. 30, 1952 |
| 2,657,716 | Ford | Nov. 3, 1953 |
| 2,704,225 | Anschuetz et al. | Mar. 15, 1955 |